United States Patent [19]

Danjushevsky et al.

[11] 3,920,466

[45] Nov. 18, 1975

[54] BINDER FOR CEMENTING WELLS

[76] Inventors: Solomon Isaakovich Danjushevsky, Ploschad Chernyshevskogo 7, kv. 79; Rakhil Izrailevna Liogonkaya, Novo-Izmailovsky prospekt, 53, kv. 10; Lev Girshovich Sudakas, ulitsa Shelgunova, 15, kv. 6, all of, Leningrad, U.S.S.R.

[22] Filed: July 12, 1973

[21] Appl. No.: 378,638

[52] U.S. Cl. ................................. 106/117; 106/121
[51] Int. Cl.$^2$ .......................................... C04B 7/14
[58] Field of Search ................... 106/117, 121, 85

[56] References Cited

UNITED STATES PATENTS

| | | | |
|---|---|---|---|
| 1,456,667 | 5/1923 | Berry | 106/85 |
| 2,049,882 | 8/1936 | Witty | 106/117 |

*Primary Examiner*—J. Poer
*Attorney, Agent, or Firm*—Haseltine, Lake & Waters

[57] ABSTRACT

A binder for the cementing of wells at a temperature of 100° to 200°C and a pressure not over 1000 atm includes blast-furnace slag, quartz sand and magnesium oxide with a refractive index between 1.722 and 1.734.

2 Claims, No Drawings

BINDER FOR CEMENTING WELLS

The present invention relates to building materials, and more specifically relates to binders used in cementing bore wells.

The present invention may be used to advantage in cementing oil and gas wells as well as other wells at a temperature of 100° to 200°C and under a pressure not over 1000 atm.

The materials used in cementing wells should meet a number of requirements such as the formation of pumpable suspensions in water or aqueous solutions of organic and inorganic compounds which neither thicken nor set and harden at a temperature of 100° to 200°C and a pressure not over 1000 atm within the time interval required to complete the plugging; on hardening said materials should form a stone with good strength, durability and limited water and gas permeability.

It is known that high-alumina binding materials, such as aluminous cement, are quite unsuitable for cementing wells at a temperature of 100° to 200°C and under a pressure not over 1000 atm whereas highly basic silicate binding materials, such as portland cement, are suitable for the same purpose only to a limited extent, the reasons being short life of the structures formed and difficulties experienced in controlling the setting time of said binders.

At present there is known a binder suitable for cementing wells at a temperature of 100° to 200°C and a pressure not over 1000 atm, said binder being based on low-basicity silicates, such as granulated blast-furnace slag and bellite slurries of various kinds, to which quartz sand may be added.

A common disadvantage of binders finding application in cementing wells at a temperature of 100° to 200°C and a pressure not over 1000 atm is in the fact that the binder decreases in volume while hardening. Since the linear shrinkage may reach 2%, this may lead to impaired sealing of the well and provoke the formation of voids in the annular space, resulting in losses of petroleum or gas or in flooding of the well.

It is an object of the present invention to provide a binder for cementing wells at a temperature of 100° to 200 °C and a pressure not over 1000 atm which will provide for the improvement of the conditions of sealing the well.

Said object is attained by the fact that the binder for cementing wells which includes blast-furnace slag also contains, in accordance with the invention, magnesium oxide with a refractive index between 1.722 and 1.734 taken in an amount between 5 and 10 wt. %.

The use of the binder of a composition disclosed herein enables reliable sealing of wells so as to improve the well yield and the quality of the product obtained.

It is expedient that the binder disclosed herein also contains quartz sand in an amount not over 60 wt %. The presence of quartz sand in the binder disclosed reduces the reactivity of the cementing mixture, thereby improviing the properties of the binder at elevated temperatures.

Other objects and advantages of the present invention are apparent from the following detailed description of the invention and the examples of its embodiment.

Our invention comprises introducing magnesium oxide into the binder for the cementing of wells at a temperature of 100° to 200°C and a pressure not over 1000 atm, said binder being prepared from blast-furnace slag with the possible addition of quartz sand.

The presence of magnesium oxide in the binder as a component is conducive to an increase in the volume of the hardening mass of the binder in the course of hydration, mainly by virtue of the crystallization processes involved in the formation of magnesium hydroxide. Apart from that, the magnesium hydrosilicate forming under said conditions also adds to the volume of the binder.

To obtain the desired result, it is of importance to maintain the rate of chemical change during the process of hydration in agreement with the rate at which the formation of the structure of cement stone takes place. If the hydration of the magnesium oxide introduced is a rapid one occurring too early, the result will be an insignificant one since the hydration of magnesium oxide and all the crystallization processes involved will take place in a mobile phase, which a suspension actually is, without affecting the volume. On the other hand, a retarded process of magnesium oxide hydration may bring about excessive straining of the cement stone which has formed, resulting in fracturing and eventual disintegration of the stone.

We have found that the appropriate relationship between the rate of chemical change during the hydration of magnesium oxide and the rate at which the formation of the structure of cement stone takes place depends on the condition of the magnesium oxide introduced, said condition being controlled by the refractive index.

According to our invention, we use magnesium oxide with a refractive index between 1.722 and 1.734.

The use of a binder containing magnesium oxide with a refractive index between 1.722 and 1.734 in addition to other components makes the hermetic cementing of wells at a temperature of 100° to 200°C and a pressure not over 1000 atm a practical possibility.

The amount of magnesium oxide to be introduced is governed by the necessity to obtain a pronounced expanding effect on one hand so that this brings the lowest limit down to 5 wt %; on the other hand, a magnesium oxide content exceeding 10 wt % impairs the mechanical strength of concrete stone so that it becomes inadequate.

In some cases it is preferable to introduce not more than 60 wt % of quartz sand into the binder used for cementing wells at a temperature of 100° to 200°C and a pressure not over 1000 atm in order to reduce the overall reactivity of the cementing mass and to increase the durability of cement stone.

We prefer to use a binder with the ingredients ground so that between 10 and 20% of the particles are retained on a sieve with 4900 meshes per square centimeter.

EXAMPLE 1

A binder in an amount of 200 $t$ was obtained by grinding 180 $t$ of granulated blast-furnace slag with 20 $t$ of magnesium oxide, using a ball mill. The fineness of grinding was characterized by the fact that 15.4% of the particles were retained on a sieve with 4900 meshes per square centimeter. The binder thus obtained was tested at a temperature of 150°C and a pressure of 400 atm. The results of the tests were as follows:

flexural strength (after 48 hours), 26 kg/cm$^2$;
setting time (with retarder), 1 hr 45 min;

linear expansion, 0.4%.

EXAMPLE 2

A binder in an amount of 1 t was obtained by grinding 360 kg of granulated blast-furnace slag with 540 kg of quartz sand and 100 kg of magnesium oxide. The fineness of grinding was characterized by the fact that 12.2% of the particles were retained on a sieve with 4900 meshes per square centimeter. The binder thus obtained was tested at a temperature of 200°C and a pressure of 700 atm. The results of the tests were as follows:

flexural strength (after 48 hours), 44 kg/cm$^2$;
setting time (with retarder), 2 hrs;
linear expansion, 0.2%.

What is claimed is:

1. A binder for cementing wells at a temperature of 100° to 200°C and under a pressure not over 1000 atm which consists essentially of blast-furnace slag and between 5 and 10wt. % of magnesium oxide having a refractive index between 1.722 and 1.734.

2. A binder for cementing wells at a temperature of 100° to 200°C and under a pressure not over 1000 atm according to claim 1 which further includes quartz sand as a component in an amount not exceeding 60 wt %.

* * * * *